UNITED STATES PATENT OFFICE 2,099,602

LUMINESCENT GLASS

Hellmuth Fischer, Ilmenau, Germany

No Drawing. Original application February 21, 1934, Serial No. 712,440. Divided and this application February 21, 1936, Serial No. 65,064. In Germany May 20, 1933

7 Claims. (Cl. 106—36.1)

This application is derived by division from an application filed by me February 21, 1934, Serial No. 712,440 now Patent 2,097,275.

The object of the improvements is to produce a glass which has high luminescence when it is subjected to the various rays produced by electrical discharge devices, and which therefore may be advantageously used as the wall or part of the wall of such electrical discharge devices, or which may form another part of such devices for increasing the luminous efficiency thereof.

Generally speaking I have found that numerous metals may be used for imparting luminescence to a glass exposed to the rays produced in electrical discharge devices or lamps, provided that care is taken that the amount of other substances in the glass which prevent luminescence is reduced below a certain critical point, or that if possible such substances are entirely avoided. Substances which are most conspicuous in this respect are iron salts, which generally tend to reduce luminescence imparted to the glass by other bodies. Thus, for example, I have found that the luminescence of uranium glass may be considerably increased if the amount of iron in the glass is reduced. Further, I have found that other substances which of themselves produce luminescence are effective to prevent the luminescence of other substances. Examples of such other substances are lead salts. Thus, by reducing the amount of the said detrimental substances, for example iron salts, in the glass, or by melting a glass free from lead compounds and nearly free from iron compounds as well, I am enabled to produce a great number of sorts of glass which have more or less luminescence, and which are adapted to transform invisible rays such as corpuscular-rays or wave-rays (cathode-rays, ultra-violet rays, etc.) into visible rays of different colors. The luminescence spectrum of these glasses is continuous, and it comprises either some or all of the colors of the spectrum from violet to red.

If such glasses are used for making receptacles for electrical discharge devices—such for example as lighting tubes, cathode glow lamps, lamps in which an incandescent filament emits ultra-violet rays and electrons, Crookes' tubes, Braun's cathode ray oscillographs, X-ray tubes—the following results are obtained:

1. By transformation of the invisible ultraviolet rays into visible light rays the amount of light emitted from the tube or lamp is increased, and also the energy of the electrons and ions which impinge upon the glass wall with certain gas pressures may be transformed into visible light.

2. If in a lighting tube the color of the luminescence of the glass is different from the color of the radiation of the gas, the color of the radiation of the lighting tube or glow lamp may be modified in a desired manner by additive mixture of the radiations of the gas and the luminescence.

3. Ordinarily the radiation of the rare gases or metal vapours used in lighting tubes or lamps comprises only some wave lengths. Therefore, by the continuous spectrum of the luminescence of the glass wall the intervening spaces of the spectrums are filled out, so that the tube emits light which has a continuous spectrum, similar to that of an incandescent solid body, and the objects illuminated by the tube or lamp appear in their natural colors. Any desired color may then be attained merely by surrounding the lamp with a screen of appropriate color.

4. The cathode rays which are produced in many electrical discharge tubes are made visible by impinging upon the luminescent glass. Therefore, a layer of luminescent substances within such tubes may be dispensed with. Further, X-rays impinging upon the luminescent glass wall or on a screen made from such glass are made visible.

From the general description it will be understood that my invention is based on an entirely new principle, permitting the production of luminous glasses which have high luminescence when they are used as the wall or a part of the wall of an electrical discharge device, or when they form such other parts of receptacles or lamps as are exposed to the different rays produced within the said receptacles. The luminescence of most of the glasses of my invention is satisfactorily produced only if they are used as parts of or in connection with electrical discharge devices. If the luminescence of the glass is tested in the usual way, by exposing the same to the filtered ultraviolet rays of a quartz-mercury lamp, only a weak luminescence is observed, because by this lamp rays are emitted with a range of wave lengths which are hardly adapted to excite luminescence in such glasses. There is only one exception, which is uranium glass which has high luminescence also in the dark ultra-violet of such lamps. Therefore it is a surprising result that the glasses have high and even very high luminescence when they are used in connection with electrical discharge devices, particularly as walls of lighting tubes which are filled with a mixture of rare gas and mercury-vapour or other metal vapour. Typical examples of such glasses are those that contain compounds of tin, lead, or niobium. For example, in filtered ultra-violet light, glasses containing lead have a very weak pink luminescence, while as a part of an electrical discharge device their luminescence is of an intense blue. On the other hand, it should be remarked that some glasses have a good luminescence in the dark ultra-violet light, while their luminescence in connection with an electrical discharge device is very weak. Examples of such glasses are those which contain cerium.

All the glasses that are used according to my invention as the wall or part of the wall of electrical discharge devices or lamps are manufactured according to a general principle. Thereby the luminescence of all the glasses is considerably intensified, and the luminescence of uranium or lead glass is increased from the intensity heretofore observed to a higher intensity. The luminescence of the other glasses, which under known conditions is practically zero, is likewise increased to an intensity which in some cases is equal to the luminescence of uranium or lead glass.

In carrying out the invention the glass should contain the metal producing luminescence in any suitable combination and within the proper limits of concentration, and, further, the content of the aforesaid detrimental matter such as iron in the glass must be below a certain maximum, which maximum is different according to the active metal contained in the glass and producing the luminescence. Further, according to my invention, the glass may contain two or more metals imparting luminescence thereto. I have found that in glasses which are known to be luminescent, and which contain equal amounts of the same metal compound imparting luminescence the glass having the lower iron content has the stronger luminescence. If the iron content of such a glass is reduced to a fraction of the content of iron ordinarily found in the glass, the intensity of the luminescence is frequently increased in usual electric discharge devices to a multiple of the original value. As far as I am aware, this increase in the luminescence of the glass walls in electrical discharge devices by reduction of the iron content in such a glass was not known, and no relation between iron content and luminescence has heretofore been perceived in the manufacture of glass. The result could not be expected from the present knowledge of the art.

Further, I have found, that numerous other metal compounds, being introduced into and forming components of the glass, fail to impart luminescence thereto, exclusively for the reason that luminescence is prevented by the presence of iron. Iron is usual in glass from which electrical discharge devices are made, the said iron being contained in the raw material. If, however, glass containing any of such metal compounds is melted with a very small iron content, and if electrical discharge devices are made therefrom, luminescence will be found to begin, as the iron content is reduced, at first in a small degree, and thereafter in a rising degree. Finally, the luminescence of such glasses of very low iron content attains values that in part are higher than the values afforded by glasses which heretofore have been used by reason of their luminescence, as parts of electrical discharge devices, such as uranium glass and lead glass. In glasses containing different metals the amount of the iron content below which slight luminescence begins is different, and, further, the increase of luminescence caused by further reduction of the iron content of the glass is different. Therefore, when the intensity of the luminescence is plotted in a diagram as a function of the iron content of the glass, the sorts of glass will have different characteristic curves.

A glass containing lead and having an iron content of 0.05% $Fe_2O_3$ has a weak blue luminescence when it is used in a lighting tube filled with a mixture of rare gases and mercury vapour. The increase in the light intensity of this tube by luminescence of the glass wall is not much more than 10%, as compared to a tube of the same inner diameter and the same thickness of the wall that is made from glass which is not luminescent. If, however, the wall of the tube is made from a glass of the same lead content, in which the iron content is only 0.012% $Fe_2O_3$, the intensity of the light of the tube is increased, by the blue luminescence of the glass wall, almost by 130%. The spectrum of the luminescence of the glass extends continuously from violet to red, its highest intensity being in the blue part of the spectrum. This result was found by measurement of the total radiation of the tube by means of a photo cell that has a curve of sensitiveness corresponding to that of the human eye. If the $Fe_2O_3$ content of the glass is reduced to 0.008%, the increase of the light intensity of the tube is more than 140%. As far as I am aware, glass containing lead and having a content of $Fe_2O_3$ less than 0.04% has heretofore not been used in the manufacture of electrical discharge devices and for other purposes. Therefore a glass which contains lead, and in which the iron content is less than 0.03% $Fe_2O_3$ is within the field of my invention.

If a discharge device of the same character is made from uranium glass that is free from lead and that contains 2.2% $U_3O_8$ and 0.095% $Fe_2O_3$, the increase of the light intensity as compared to a device of equal dimensions and made from a colorless glass that is not luminescent is about 14%. Notwithstanding the comparatively intense luminescence of the uranium glass, this value is so small because the glass itself (which has a yellowish color) absorbs a part of the violet and blue rays emitted from the gas. If a glass is used in which the $Fe_2O_3$ content of the glass is about 0.012%, while the $U_3O_8$ content is the same as before, the light intensity is increased, by the considerable increase of the intensity of the luminescence, not by 14%, but by about 105%.

If the necessity of increasing the intensity of the luminescence of the glass is less important than the desire to save expensive active metal compounds, for example uranium oxide, the same luminescence as in a glass of high iron content may be obtained according to my invention with a considerably lower amount of the active metal compound. In most cases it is even possible simultaneously to save metal compound which can be excited to luminescence and to increase the luminescence of the glass. This is particularly conspicuous where the compound of the excitable metal causes absorption of the visible rays, which is the case for example in connection with compounds of uranium or copper. Therefore, when the uranium content is reduced the yellow-green color of the glass is weakened and when the copper content is reduced the blue color of the copper is weakened.

A lighting tube filled with a mixture of rare gas and mercury vapour, and having a glass wall containing 0.6% $U_3O_8$ and 0.014% $Fe_2O_3$ has substantially the same light intensity as a tube of the same dimensions the glass wall of which contains 2% $U_3O_8$ and 0.1% $Fe_2O_3$. This is explained by the increase in the intensity of the luminescence of the glass by the reduction of the iron content, whereby the reduction of the uranium content is partly compensated; and, further, it is explained by the reduced absorption of the glass poor in uranium. The reduction of the cost caused by the reduction of the uranium content in the glass wall is obvious. This is practically a most important embodiment of my invention.

Heretofore uranium glass for electrical discharge devices and other purposes has not been manufactured with a lower iron content than lead-containing glass used in such discharge devices—that is, with a $Fe_2O_3$ content less than about 0.04%. A glass containing uranium and having an iron content of less than 0.025% $Fe_2O_3$ is within the field of my invention.

If electrical discharge devices of similar type are made from glass containing vanadium, conditions prevail, with reference to the luminescence of the glass with varying iron contents, that are similar to those described above. The color of the luminescence of such glasses is brownish-yellow. Glass containing vanadium and having an iron content less than 0.03% $Fe_2O_3$ is within the field of my invention.

Glass of this character, in which the $Fe_2O_3$ content is reduced as stated above, may be manufactured by using substantially the same raw materials as heretofore in the manufacture of the glass. But the iron content of the glass material or the major part thereof must be so small that the iron content of the glass melted therefrom is less than the critical values stated above.

It is not necessary that the active metal compounds in the glass for the discharge receptacle be present in a definite concentration, but the concentration may be held within greater or smaller limits, according to varying conditions. But only if the amount of metal is equal to or more than a certain minimum the luminescence of the glass obtains values that are practically important. It should be understood that when the active metal is present in this small concentration, the iron content also of the glass should be as small as possible. The smaller the said iron content, the smaller is the amount of active metal needed for producing a sufficiently intense luminescence of the glass wall. In glasses containing lead, uranium, or tin the said lower limits are about 0.06% Pb, 0.0005% U and 0.01% Sn, it being understood that the $Fe_2O_3$ content of the glass is not more than about 0.005%. I wish it to be understood that these figures are only approximate.

The upper limit to the content of active metal in luminescent glass according to my invention depends on various factors. In glasses that contain for example uranium, copper, nickel, cobalt, or vanadium, the upper limit of the amount of such metals in the glass wall is determined by the absorption of the glass which should not be too high. If the concentration of the said metals is too high, a considerable proportion of the radiation of the luminescence (and in lighting tubes and cathode glow lamps also a considerable part of the gas radiation) is lost. However, a sharp upper limit to the content of active metal cannot be given for each glass. Further, the maximum of the addition of active metal in the glass may be determined by the fact that a part of the said active metal might be precipitated in the glass in elemental form. For example, in a glass that contains gold as an active metal, say in the form of gold chloride, a part of the gold is separated in the form of the element and imparts purple color to the glass, if the content of gold in the glass exceeds a certain maximum, the said precipitated metal absorbing a high proportion of the luminescence or other radiation if the glass forms a part of a luminous tube. If luminescent glass contains lead, the upper limit for the lead content of this glass is determined by the possibility of working the glass under the blast flame, which working is made more difficult as the lead content is increased. It is further determined by the yellow color of the glass, which increases with the lead content, and which absorbs a part of the light passing through the glass. And it is finally determined by the reduction of the luminescence of the glass wall that takes place when the lead content is very high. According to the character and the shape of the discharge receptacle, the walls of which are made from the said glass, one or the other of the aforesaid factors prevails in determining the upper limit to the lead content, and therefore the said limit varies according to different conditions. Similar considerations prevail in luminescent glass containing silver, arsenic, or antimony. In glass which contains tin or tungsten added to the batch in the form of tin dioxide or tungsten trioxide, the upper limit to the content in the glass of such metals is also determined by the possibility of excessive opacification, which might impair the permeability of the glass.

The color of the luminescence of the glass may be changed by varying the composition of the body of glass, for example by using larger or smaller amounts of boric acid or phosphoric acid in lieu of the silicic acid.

If a glass containing compounds of praseodymium and neodymium is used as the wall of electrical discharge tubes, it has a violet to reddish luminescence. The limit for the iron content below which the luminescence of the glass wall is considerably intensified is about 0.03%, and therefore a glass which contains in addition to these metal compounds less than 0.03% $Fe_2O_3$ is within the field of my invention.

As has been mentioned above, it was not known that quite a number of metals may be used for making glasses which in part have intense luminescence, provided that the iron content in the glass does not exceed a certain value, and that the glass is used as the wall or a part of the wall or as another part of an electrical discharge device. These metals may be contained in the glass in any suitable combination, for example, in the form of an oxide, a silicate, a borate, a phosphate, a sulphide, a selenide, a halide etc., provided that they are not precipitated in elemental form, as gold and silver will do. The figures hereinafter referred to of the iron contents of the glass are to be understood to be the limits above which luminescence is not of practical value. If the iron content is less than the said limits, luminescence begins to gain in intensity. Under these circumstances luminescence has heretofore not been observed, and therefore such glasses have never been used in electrical discharge devices with this property in view. In order to obtain the highest possible luminescence, the glass must be melted as poor in iron as is technically possible.

In the following I shall describe a series of glasses that have been tested by me as to their luminescence by giving the percentages of the active metals and the maximum of the iron content therein, and I wish it to be understood that all the glasses tested by me had a composition similar to the one referred to hereafter and containing quartz, boric acid, soda, and potash, though my invention is not limited to this composition of the glass. For example, I may also use glasses that contain lithia as an alkaline component.

A glass containing copper, which has been added to the batch in the form of copper oxide, for example, and which has gone into solution, has a strong whitish-yellow luminescence under the aforesaid conditions, if the iron content is less than about 0.03% $Fe_2O_3$. An 0.08% content of copper oxide has been found to give good results.

A glass containing silver, which has been added to the batch in the form of silver nitrate, for example, and which has gone into solution, was found to be whitish-yellow-luminescent if the iron content is less than about 0.03% $Fe_2O_3$. An 0.13% content of silver has been found to give good results.

A glass containing gold, which has been added to the batch in the form of gold chloride, for example, and which has gone into solution, has whitish luminescence if the iron content is less than about 0.03% $Fe_2O_3$. A 0.014% content of gold has been found to give good results.

A glass containing cadmium, which has been added to the batch in the form of cadmium oxide, sulphide or selenide, for example, and which has gone into solution, has reddish-yellow or orange luminescence if the iron content is less than about 0.025% $Fe_2O_3$. A 0.3% content of cadmium sulphide has been found to give good results.

A glass containing barium, which has been added to the batch in the form of barium carbonate or nitrate, for example, and which has gone into solution, has reddish luminescence, if the iron content is less than about 0.025% $Fe_2O_3$. An 0.85% content of barium oxide has been found to give good results.

A glass containing yttrium, which has been added to the batch in the form of yttrium carbonate, for example, and which has gone into solution, has reddish-white luminescence, if the iron content is less than about 0.03% $Fe_2O_3$. A 0.13% content of yttrium oxide has been found to give good results.

A glass containing lanthanum, which has been added to the batch in the form of lanthanum carbonate, for example, and which has gone into solution, has reddish luminescence, if the iron content is less than about 0.03% $Fe_2O_3$. A 0.45% content of lanthanum oxide has been found to give good results.

A glass containing samarium, which has been added to the batch in the form of samarium oxide, for example, and which has gone into solution, has reddish luminescence if the iron content is less than about 0.03% $Fe_2O_3$. A 0.4% content of samarium oxide has been found to give good results.

A glass containing erbium, which has been added to the batch in the form of erbium oxide, for example, and which has gone into solution, has reddish-yellow luminescence if the iron content is less than about 0.03% $Fe_2O_3$. A 0.6% content of erbium oxide has been found to give good results.

A glass containing thallium, which has been added to the batch in the form of thallium carbonate or oxide, for example, and which has gone into solution, has blue luminescence, if the iron content is less than about 0.03% $Fe_2O_3$. A 0.18% content of thallium oxide has been found to give good results.

A glass containing zirconium, which has been added to the batch in the form of the hydrated oxide, for example, and which has gone into solution, has yellowish luminescence, if the iron content is less than about 0.03% $Fe_2O_3$. A 0.85% content of zirconium oxide has been found to give good results.

A glass containing tin, which has been added to the batch in the form of tin dioxide or stannous oxide, for example, and which has gone into solution, has a strong reddish-yellow luminescence, if the iron content is less than about 0.05% $Fe_2O_3$. A 0.75% content of stannous oxide has been found to give good results.

A glass containing ytterbium, which has been added to the batch in the form of ytterbium nitrate, for example, and which has gone into solution, has orange-red luminescence, if the iron content is less than about 0.03% $Fe_2O_3$. A 0.35% content of ytterbium oxide has been found to give good results.

A glass containing thorium, which has been added to the batch in the form of thorium carbonate, for example, and which has gone into solution, has reddish-white luminesence, if the iron content is less than about 0.03% $Fe_2O_3$. A 0.35% content of thorium oxide has been found to give good results.

A glass containing arsenic, which has been added to the batch in the form of arsenic trioxide, for example, and which has gone into solution, has reddish-white luminesence, if the iron content is less than about 0.03% $Fe_2O_3$. A 0.85% content of arsenic trioxide has been found to give good results.

A glass containing antimony, which has been added to the batch in the form of antimony trioxide, for example, and which has gone into solution, has a strong reddish-white luminescence; and if the metal has been added to the batch in the form of antimony trichloride it has white luminescence, if in both cases the iron content in the glass is less than about 0.04% $Fe_2O_3$. A 1.1% content of antimony trioxide has been found to give good results.

A glass containing bismuth, which has been added to the batch in the form of oxide or the hydrated oxide, for example, and which has gone into solution, has purple luminescence, if the iron content is less than about 0.03% $Fe_2O_3$. A 0.6% content of bismuth oxide has been found to give good results.

A glass containing niobium, which has been added to the batch in the form of niobium pentoxide, for example, and which has gone into solution, has a strong whitish-yellow luminescence, if the iron content is less than about 0.05% $Fe_2O_3$. A 0.65% content of niobium pentoxide has been found to give good results.

A glass containing tantalum, which has been added to the batch in the form of tantalum pentoxide, for example, and which has gone into solution, has a strong yellowish-white luminescence, if the iron content is less than about 0.05% $Fe_2O_3$. A 0.75% content of tantalum pentoxide has been found to give good results.

A glass containing chromium, which has been added to the batch in the form of chromic oxide, for example, and which has gone into solution, has dark-blue luminescence, if the glass has been subjected to reducing melting and if the iron content is less than about 0.025% Fe₂O₃. A 0.05% content of CrO (chromous oxide) has been found to give good results.

A glass containing molybdenum, which has been added to the batch in the form of sodium molybdate, for example, and which has gone into solution, has red luminescence, if the iron content is less than about 0.04% Fe₂O₃. A 0.65% content of molybdenum trioxide has been found to give good results.

A glass containing tungsten, which has been added to the batch in the form of tungsten trioxide or sodium tungstate, for example, and which has gone into solution, has whitish luminescence, if the iron content is less than about 0.04% Fe₂O₃. A 0.7% content of tungsten trioxide has been found to give good results.

A glass containing cobalt, which has been added to the batch in the form of cobalt oxide, for example, and which has gone into solution, has a dull reddish-yellow luminescence, if the iron content is less than about 0.025% Fe₂O₃. A 0.0087% content of cobalt oxide has been found to give good results.

A glass containing nickel, which has been added to the batch in the form of nickel carbonate or oxide, for example, and which has gone into solution, has reddish luminescence, if the iron content is less than about 0.03% Fe₂O₃. A 0.015% content of the lower nickel oxide has been found to give good results.

The spectrum of the luminescence of all of the said sorts of glass is continuous, and it extends in some cases from violet to red.

I wish it to be understood that the above metals are examples only and that there are other metals in the periodic system that are adapted to impart luminescence to the glass if the iron content is sufficiently reduced, so that the number of such metals might be increased.

I have tested substantially all of the metals, with the end in view of determining the serviceability of their compounds as luminescence-affording substances under the circumstances here specified. There remained but a few—radium, for example—that, because of their great expense, were beyond my ability to test (and, for the same reason, beyond the range of practical importance). Of those that I have tested, iron alone is unsuitable; and this for the reason that its compounds, although responsive to excitation, so that they too emit radiation, emit rays that are infra-red, and accordingly invisible. All the other metals are serviceable. But, although the metals generally (and subject to the qualifications stated) are serviceable, they are not equally effective, nor are they, with practical considerations in view, equally desirable. The total light emitted for example from a high voltage lighting tube filled with rare gas and mercury vapour and charged with a current of about 35 to 40 milliamperes is intensified in different degrees, if its wall is made from a glass which is poor in iron and contains one of the aforesaid metals in any suitable form of combination, as compared to the intensity of the radiation of a similar tube made from transparent glass having no luminescence. When the glass wall of the said lighting tube contains 0.07% copper oxide, the increase of the total light emitted from the device is 35 per cent., and if the glass wall contains 0.015% of gold, the increase of the light is 18%. If the glass wall contains 1.13% antimony oxide, the increase is 50%. If the wall is made dull (as by sandblasting), the increase is, in the case last specified, of antimony oxide, 91%. With a content of 3% antimony oxide the volume of light is, in a smooth-surfaced tube, increased by 51%, and if the same glass is made dull at its outer surface, the increase is 97%. If the glass wall contains 0.73% stannous oxide or stannous chloride, the increase is 46%, and if the outer surface of the said glass wall is made dull, the increase is 82%. If the glass wall contains 0.63% of anhydrous niobium acid, the increase is 55%.

Of all the metals I have found the compounds of tin most effective and desirable. By the compounds of the bivalent tin the same reddish luminescence is imparted to the glass as by the quadrivalent tin, but the intensity is much higher. Therefore compounds of the bivalent tin are preferred to those of the quadrivalent tin. I have tested the different compounds of the bivalent tin to find out what compound gives the best results, and I have found that the compounds: stannous oxide, tin sulfide, tin selenide, stannous fluoride, stannous chloride have substantially similar value. But stannous chloride may be readily obtained in a very pure form free of iron. Though stannous oxide ordinarily contains a little iron, yet it is preferred to stannous chloride for the reason that the glass melted therewith is in a less degree subject to devitrification, particularly, if the glass contains little alumina.

In the same group with tin (Group IV of the periodic series) are found the metals thorium, lead, zirconium and the rare earths of the atomic weight 140–178. I have tested all of these; the compounds of all of them are serviceable; and among them the compounds of lead are particularly effective and desirable. Uranium, in Group VI, is next to tin, most effective and desirable. In Group VI, along with uranium, are found chromium, molybdenum, and tungsten. All of these I have tried, and all with success; the compounds of tungsten, however, are particularly effective and desirable. Group I includes copper, silver, and gold. All of these I have tried with success; but the compounds of copper have proved to be particularly effective and desirable. In Group V are found vanadium, niobium, tantalum, arsenic, antimony, and bismuth. I have tested all of these, and all with success; but I have found that the compounds of vanadium, niobium, tantalum, and antimony to be peculiarly effective and desirable. It remains to say that in group II barium and cadmium are found; in Group III yttrium, lanthanum, and thallium. The compounds of lanthanum have proved to be particularly valuable. In Group VIII are cobalt and nickel, all substances the compounds of which are effective, in the manner described; but since luminescence is either weak or has no proper color, these substances are for the present of less practical value and importance.

As the art stands, the three important elements for my purpose are (in order of preference) tin, uranium, and lead; but the circumstances of the industry may change, so that within the field that I have explored, and without additional invention, other particular substances may become of equal or even of greater importance. For instance, some vapour other than that of mercury may in the progress of the art be employed as the conducting vapour within luminous tubes and in that event the compounds of other metals would in all likelihood be found preferable to those of the three metals here particularly named.

My invention, therefore, comes to this, that employing a glass poor in iron, it is possible to employ as luminescence-affording material compounds of other metals in quantities smaller by far than had ever been realized, and with effects greater by far than had ever been attained.

The glasses that are used for making the glass walls of the aforesaid high voltage lighting tubes may be composed as follows:

75 kilogrammes of quartz sand containing not more than 0.01% of iron oxide ($Fe_2O_3$)=0.007 metallic iron.

7 kilogrammes of boric acid, crystallized, refined and practically free of iron.

18 kilogrammes of soda, calcined, practically free of iron.

10.7 kilogrammes of 98% potash, calcined, practically free of iron.

To this batch the aforesaid metal compounds are added, for example 1.2 kilogrammes of stannous chloride, crystallized, purest quality, or 1.15 kilogrammes of antimony trioxide, purest quality, practically free of iron.

The said percentage of stannous chloride and antimony trioxide may also be the double or a multiple of the percentage given in the examples, and it may also be reduced to one tenth and less and still the glass wall will be in some degree luminescent. But the figures given in the examples have afforded very good results. I do not wish to be understood that glasses containing tin or antimony compounds in the aforesaid proportions have the highest possible luminescence, though I believe that they approximate the best results.

In the foregoing I have given figures for the percentages of active metal in the glass that have been found to give good results. But I wish it to be understood that I do not limit myself to the said figures, and that the expert will have no difficulty in finding other figures that are suitable for the purpose aimed at in each case. Further the composition of the glass which has the excitable metal compound added thereto may be different from the composition of the batch stated above.

Care should be taken that the refractory material from which the glass melting receptacles are made contains the smallest possible percentage of iron.

If glass according to my invention, containing stannous oxide or antimony oxide is used as the wall of a luminous tube of the aforesaid type, a beautiful reddish-white light is produced which is similar to day-light, particularly if the outer surface of the tube is made dull.

The wall of the tube made from my improved glass may also be coated with an outer layer of colorless or colored opalescent glass which is fused to the luminescent body of the tube. By the last named expedients the luminescence of the glass wall is intensified by the total reflection being removed, and the light is more uniformly dispersed. The objects illuminated by the tube appear in perfectly natural colors, so that such devices or lamps may advantageously be used for domestic illumination. All the colors are more true than in the light of incandescent lamps. In the aforesaid examples the iron content of the glass walls is about 0.015% $Fe_2O_3$. The fundamental composition of the glass wall consists exclusively of four substances: silicic acid, boric acid, sodium oxide and potassium oxide. This composition of the glass is important, because not only the color but also the intensity of the luminescence largely depends on the fundamental composition of the glass. An addition of magnesium oxide (MgO), calcium oxide (CaO) or aluminium oxide ($Al_2O_3$) to the said fundamental composition reduces slightly the volume of light emitted from the discharge receptacle by reduction of the luminescence of the glass wall. By an addition of calcium oxide also the color of the luminescence of the glass is influenced. A luminous tube of the type referred to above, and which has its wall made from such a glass, does not emit any more a reddish-white light but a pale white. The chemical resistance of the glass is, furthermore, considerably improved by the presence of stannous oxide or stannous chloride or antimony oxide. The addition to the glass of these substances has therefore a similar effect as the addition of calcium oxide or aluminum oxide. Further, a variation of the proportions of the components of the batch has a certain influence on the intensity and the color of the luminescence of the glass. When they are used as the walls of electrical discharge receptacles, some of the glasses that contain one or the other of the aforesaid metals in any composition have an intense afterglow, after the lamp has been switched out, for example glasses which contain copper oxide or stannous oxide or stannous chloride.

I have explained that, by selection of luminescent glass according to my invention the luminescence may be added to the light emanating from the gas or metal vapour within the tube, to afford light of substantially complete spectrum being very similar to day-light. It follows that, in the use of the electrical discharge lamp for advertising purposes, any desired color may be gained, merely by enclosing the tube of my invention in an outer shell of ordinary glass of appropriate color.

If it is desired to produce a particular color or a particular intensity of the luminescence of the glass, two or more compounds of differently acting metals may be simultaneously present in the glass. In this case the iron content of the glass, calculated as $Fe_2O_3$, should not be higher than the iron content allowed in the glass in which only the metal is contained for which the smallest iron content in the glass is claimed, or in other words, in which the limit of the permissible iron content is the lower one. Under this condition all the active metals are brought to the desired action substantially in an undiminished degree. In a lighting tube of the character described above, the wall of which consists of a glass containing 0.63% $SnO_2$, 0.53% $Sb_2O_3$ and 0.015% $Fe_2O_3$, the increase of the light emitted by luminescence of the glass wall is about 73%.

When active metals are combined, care should be taken that the metals are selected so that the luminescence of the glass imparted by one metal is not impaired by another active metal. For example, an active metal may perfectly remove the activity of another metal, even if so much of the last-named metal is added to the glass as otherwise would be sufficient for producing intense luminescence of the glass. If the glass of the wall of an electrical discharge device contains 0.8% $SnO_2$ and 0.06% CuO, the color and intensity of the luminescence is the same as that of glass containing only copper oxide. If the said glass of the wall simultaneously contains 0.63% SnO₂ and 0.17% PbO, it has in substance only the blue luminescence of a glass containing lead.

It may also happen that, though the spectra of luminescence produced by the active metals contained in the glass are all contained in the total luminescence of the glass, yet the intensity of the luminescence of the glass is smaller than the sum of the intensities of the individual luminescence produced when different glasses each contain corresponding amounts of one only of the said metals. An example is a glass forming the wall of a high-voltage lighting tube of the type referred to above, which contains simultaneously 0.06% CuO, 1% Sb₂O₃ and 0.015% Fe₂O₃. The color of the luminescence is a mixture of that of a glass wall containing only CuO and a glass wall containing only Sb₂O₃. The increase of the emitted light is only 37%, and if the outer surface of the glass wall has been made dull, it is 83%, which is less than the increase produced by an equal amount of antimony oxide if added alone for the purpose in view.

I claim as my invention:

1. A glass, containing in solution a luminescence-affording compound of tin, and having an iron oxide (Fe₂O₃) content in an amount not exceeding 0.05%.

2. A glass, containing in solution a luminescence-affording compound of uranium, and having an iron oxide (Fe₂O₃) content in an amount not exceeding 0.025%.

3. A glass batch for the wall of an electric discharge device compounded according to the following formula—quartz sand, containing iron in quantity not more than 0.01% Fe₂O₃, 75 parts; boric acid, crystallized, refined, and practically free of iron, 7 parts; soda, calcined, practically free of iron, 18 parts; potash (98%), calcined, practically free of iron, 10.7 parts; and containing a luminescence-affording content of stannous chloride, crystallized, and of purest quality.

4. A glass batch for the walls of an electric discharge device compounded according to the following formula—quartz sand, containing iron in quantity not more than 0.01% Fe₂O₃, 75 parts; boric acid, crystallized, refined, and practically free of iron, 7 parts; soda, calcined, practically free of iron, 18 parts; potash (98%), calcined, practically free of iron, 10.7 parts; and containing a luminescence-affording content of antimony trioxide of purest quality and practically free of iron.

5. Glass containing, with the glass-forming ingredients, substantially SnO₂, 0.63%; Sb₂O₃, 0.53%; Fe₂O₃, 0.015%.

6. A glass that includes in its composition a luminescence-affording compound of a metal selected from a group that consists of uranium, vanadium, copper, tin, antimony, niobium, tantalum, lanthanum, and tungsten, the glass having a content of Fe₂O₃, such content not exceeding, respectively, in the cases of the compounds named 0.025%, 0.03%, 0.03%, 0.05%, 0.04%, 0.05%, 0.05%, 0.03%, and 0.04%.

7. A glass, containing in solution a luminescence-affording compound of antimony, and having an iron oxide (Fe₂O₃) content in an amount not exceeding 0.04%.

HELLMUTH FISCHER.